(12) United States Patent
Oyama

(10) Patent No.: US 10,768,875 B2
(45) Date of Patent: Sep. 8, 2020

(54) IMAGE FORMING SYSTEM FOR EXECUTING CONFIDENTIAL PRINT JOB BASED ON LOCATION OF SENDER

(71) Applicant: KYOCERA Document Solutions Inc., Osaka-shi, Osaka (JP)

(72) Inventor: Kuniaki Oyama, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/535,450

(22) Filed: Aug. 8, 2019

(65) Prior Publication Data
US 2020/0065040 A1 Feb. 27, 2020

(30) Foreign Application Priority Data
Aug. 24, 2018 (JP) .................................. 2018-156936

(51) Int. Cl.
G06K 15/00 (2006.01)
G06F 3/12 (2006.01)
H04N 1/00 (2006.01)

(52) U.S. Cl.
CPC .......... *G06F 3/1238* (2013.01); *G06F 3/1204* (2013.01); *G06F 3/1222* (2013.01); *H04N 1/00251* (2013.01); *H04N 1/00403* (2013.01); H04N 2201/0094 (2013.01)

(58) Field of Classification Search
None
See application file for complete search history.

(56) References Cited

U.S. PATENT DOCUMENTS

| 8,994,982 | B2 * | 3/2015 | Shigehisa | G06F 21/608 358/1.13 |
| 2006/0092455 | A1 * | 5/2006 | Maeda | H04N 1/4406 358/1.15 |
| 2014/0320880 | A1 * | 10/2014 | Kotsuji | G06F 3/1267 358/1.13 |

FOREIGN PATENT DOCUMENTS

JP 2004206636 A 7/2004

* cited by examiner

*Primary Examiner* — Henok Shiferaw
(74) *Attorney, Agent, or Firm* — Alleman Hall Creasman & Tuttle LLP

(57) ABSTRACT

An image forming system includes a confirmation processing portion and first and second print controlling portions. The confirmation processing portion confirms one or more pages of a multiple-page document as one or more confidential print pages. The first print controlling portion, upon receiving an execution command for a confidential print job according to which the document including the confidential print pages is printed, prints one or more normal print pages that are pages to be printed according to the confidential print job that exclude the confidential print pages, and suspends printing of the confidential print pages. The second print controlling portion prints, when it is determined that the sender of the execution command for the confidential print job has arrived at the location where the image forming apparatus is installed, the confidential print pages among the pages to be printed according to the confidential print job.

9 Claims, 5 Drawing Sheets

IMAGE FORMING SYSTEM FOR EXECUTING CONFIDENTIAL PRINT JOB BASED ON LOCATION OF SENDER

INCORPORATION BY REFERENCE

This application is based upon and claims the benefit of priority from the corresponding Japanese Patent Application No. 2018-156936 filed on Aug. 24, 2018, the entire contents of which are incorporated herein by reference.

BACKGROUND

The present disclosure relates to an image forming system for performing confidential printing, an image forming apparatus, an information processing apparatus, and an image forming method.

There is known an image forming system configured to perform so-called confidential printing that suspends execution of a print job for which execution command has been sent by an information processing apparatus, until it is determined that the sender of the execution command has arrived at the location where the image forming apparatus is installed.

SUMMARY

An image forming system according to an aspect of the present disclosure includes a confirmation processing portion, a first print controlling portion, a determination processing portion, and a second print controlling portion. The confirmation processing portion is configured to confirm one or more pages of a multiple-page document as one or more confidential print pages. The first print controlling portion is configured to, upon receiving an execution command for a confidential print job according to which the document including the one or more confidential print pages is printed, print one or more normal print pages that are pages to be printed according to the confidential print job that exclude the one or more confidential print pages, and suspend printing of the one or more confidential print pages. The determination processing portion is configured to determine whether or not a sender of the execution command for the confidential print job has arrived at a location where an image forming apparatus is installed. The second print controlling portion is configured to print, when the determination processing portion determines that the sender of the execution command for the confidential print job has arrived at the location where the image forming apparatus is installed, the one or more confidential print pages among the pages to be printed according to the confidential print job.

An image forming apparatus according to another aspect of the present disclosure includes a first print controlling portion, a determination processing portion, and a second print controlling portion. The first print controlling portion is configured to, upon receiving an execution command for a confidential print job according to which a multiple-page document that includes one or more predetermined confidential print pages is printed, print one or more normal print pages that are pages to be printed according to the confidential print job that exclude the confidential print pages, and suspend printing of the one or more confidential print pages. The determination processing portion is configured to determine whether or not a sender of the execution command for the confidential print job has arrived at a location where an image forming apparatus is installed. The second print controlling portion is configured to print, when the determination processing portion determines that the sender of the execution command for the confidential print job has arrived at the location where the image forming apparatus is installed, the one or more confidential print pages among the pages to be printed according to the confidential print job.

An information processing apparatus according to another aspect of the present disclosure includes a confirmation processing portion and a transmission processing portion. The confirmation processing portion is configured to confirm one or more pages of a multiple-page document as one or more confidential print pages. The transmission processing portion is configured to send, to an image forming apparatus, an execution command for a confidential print job according to which the document including the one or more confidential print pages is printed.

An image forming method according to another aspect of the present disclosure includes a confirming step, a first printing step, a determining step, and a second printing step. The confirming step confirms one or more pages of a multiple-page document as one or more confidential print pages. The first printing step, upon receiving an execution command for a confidential print job according to which the document including the one or more confidential print pages is printed, prints one or more normal print pages that are pages to be printed according to the confidential print job that exclude the one or more confidential print pages, and suspends printing of the one or more confidential print pages. The determining step determines whether or not a sender of the execution command for the confidential print job has arrived at a location where an image forming apparatus is installed. The second printing step prints, when it has been determined by the determining step that the sender of the execution command for the confidential print job has arrived at the location where the image forming apparatus is installed, the one or more confidential print pages among the pages to be printed according to the confidential print job.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Image Forming System 100]

Figure 1:
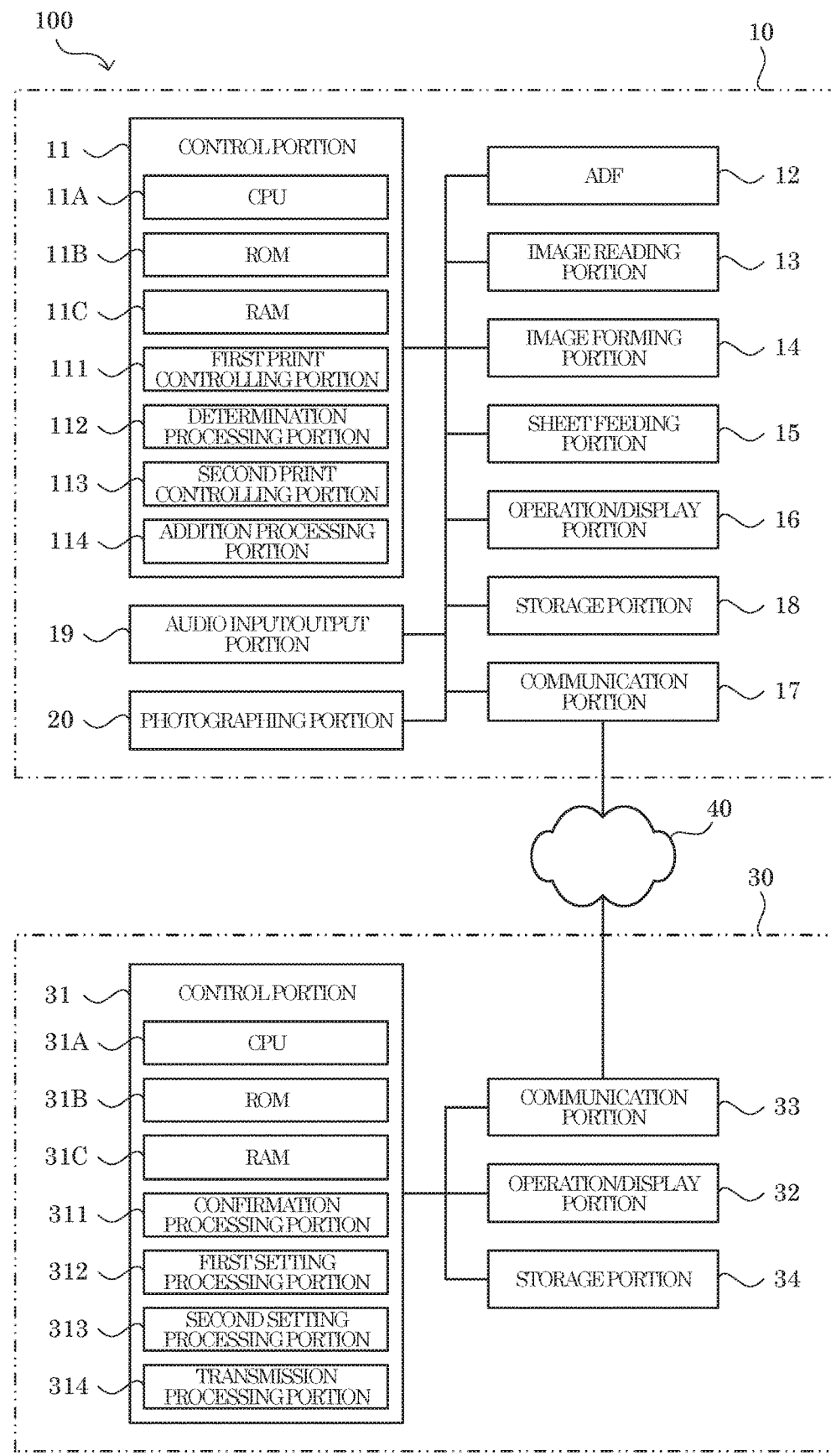
FIG. 1 is a diagram showing a configuration of an image forming system according to an embodiment of the present disclosure.

An image forming system 100 according to an embodiment of the present disclosure includes an image forming apparatus 10 and one or more information processing apparatuses 30. As shown in FIG. 1, the image forming apparatus 10 and the information processing apparatus 30 are communicably connected to one another via a communication network 40. For example, the communication network 40 is the internet or a LAN (Local Area Network). It is noted that in FIG. 1, the image forming apparatus 10 and the information processing apparatus 30 are shown as a two-dot chain line.

[Image Forming Apparatus 10]

The image forming apparatus 10 is configured to execute a print job for printing a document. For example, the image forming apparatus 10 is a multifunction peripheral including multiple functions, such as a scanning function for reading image data from a document, a printing function for forming an image based on the image data, a facsimile function, and a copying function. It is noted that the image forming apparatus 10 may be a printer, a facsimile device, or a copier.

Figure 2:
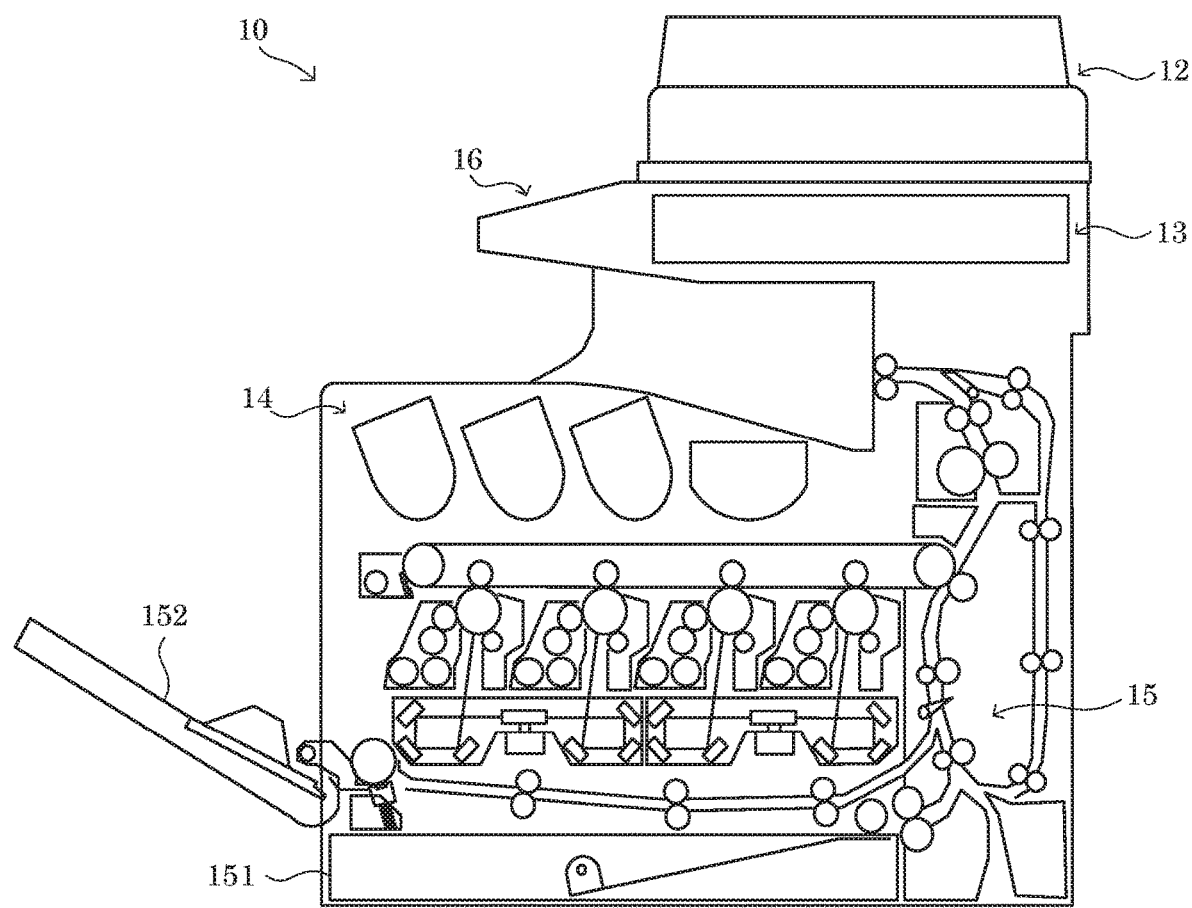
FIG. 2 is a diagram showing a configuration of an image forming apparatus included in the image forming system according to the embodiment of the present disclosure.

As shown in FIG. 1 and FIG. 2, the image forming apparatus 10 includes a control portion 11, an ADF (Automatic Document Feeder) 12, an image reading portion 13, an image forming portion 14, a sheet feeding portion 15, an operation/display portion 16, a communication portion 17, a storage portion 18, an audio input/output portion 19, and a photographing portion 20.

The control portion 11 includes control devices such as a CPU 11A, a ROM 11B, and a RAM 11C. The CPU 11A is a processor for executing various types of arithmetic processing. The ROM 11B is a nonvolatile storage device in which information, such as a control program for the CPU 11A to execute the various types of processing, is preliminarily stored. The RAM 11C is a volatile storage device used as temporary storage memory (work area) for the various types of processing that are executed by the CPU 11A. In the control portion 11, various types of control programs, preliminarily stored in the ROM 11B, are executed by the CPU 11A. This allows for the image forming apparatus 10 to be integrally controlled by the control portion 11. It is noted that the control portion 11 may be constituted by an electronic circuit such as an integrated circuit (ASIC), and may be provided separately from a main control portion that integrally controls the image forming apparatus 10.

The ADF 12 includes a document sheet setting portion, a plurality of conveyance rollers, a document sheet holder, and a sheet discharge portion. The ADF 12 is configured to convey a document sheet that is read by the image reading portion 13.

The image reading portion 13 includes a document sheet table, a light source, a plurality of mirrors, an optical lens, and a CCD. The image reading portion 13 is configured to read image data from a document sheet.

The image forming portion 14 is configured to electrophotographically form, based on the image data read by the image reading portion 13, a color or monochrome image on a sheet. In addition, the image forming portion 14 may be configured to form, based on image data input from the information processing apparatus 30, an image on a sheet. Specifically, the image forming portion 14 includes a plurality of image forming units, a laser scanning unit (LSU), an intermediate transfer belt, a secondary roller, a fixing device, and a sheet discharge tray. It is noted that the image forming portion 14 may form an image by another image forming method, such as an ink jet method.

The sheet feeding portion 15 includes a sheet feeding cassette 151, a manual feeding tray 152, and a plurality of conveyance rollers, and is configured to supply a sheet to the image forming portion 14. The image forming portion 14 forms an image based on image data on the sheet supplied from the sheet feeding portion 15.

The operation/display portion 16 includes a display portion such as a liquid crystal display for displaying various types of information in response to a control command from the control portion 11, and an operation portion such as operation keys or a touch panel for inputting, in response to an operation by a user, various types of information to the control portion 11.

The communication portion 17 is configured to execute wired or wireless data communication, via the communication network 40, with external communication devices such as the information processing apparatus 30.

The storage portion 18 is a nonvolatile storage device. For example, the storage portion 18 is a nonvolatile memory such as a flash memory or an EEPROM, an SSD (Solid State Drive), or an HDD (Hard Disk Drive).

The storage portion 18 is preliminarily stored with a print job execution program that corresponds to a print job execution process described below (see flowchart in FIG. 4). The print job execution program is for causing the CPU 11A to execute the print job execution process.

In addition, the storage portion 18 is preliminarily stored with device identification information respectively corresponding to the one or more information processing apparatuses 30. The device identification information is used to identify the information processing apparatus 30 that is the source from which an execution command for the print job is sent. For example, the device identification information is an IP address or a MAC address.

In addition, the storage portion 18 is stored with user identification information that is preliminarily made to correspond with the device identification information and used for identifying a user of the image forming apparatus 10. For example, the user identification information is voiceprint data or face image data of the user. It is noted that the user identification information may include fingerprint image data and iris image data of the user, and a password.

The audio input/output portion 19 includes a speaker for outputting audio, and a microphone for inputting speech to the image forming apparatus 10.

The photographing portion 20 includes a camera or the like for photographing the operator of the image forming apparatus 10. For example, the photographing portion 20, in response to a control command from the control portion 11, obtains image data (static image data) at a predetermined rate, such as every 0.1 seconds, and inputs the obtained image data to the control portion 11 in real time.

[Information Processing Apparatus 30]

The information processing apparatus 30 is configured to send an execution command for the print job to the image forming apparatus 10. For example, the information processing apparatus 30 is a personal computer. It is noted that the information processing apparatus 30 may be a smartphone, a tablet device, a cellphone, a PDA, or a laptop computer.

As shown in FIG. 1, the information processing apparatus 30 includes a control portion 31, an operation/display portion 32, a communication portion 33, and a storage portion 34.

Similarly to the control portion 11 of the image forming apparatus 10, the control portion 31 includes control devices such as a CPU 31A, a ROM 31B, and a RAM 31C. In the control portion 31, the CPU 31A executes various control programs preliminarily stored in the ROM 31B. This allows for the information processing apparatus 30 to be integrally controlled by the control portion 31.

The operation/display portion 32 includes a display portion such as a liquid crystal display for displaying various types of information in response to a control command from the control portion 31, and an operation portion such as operation keys or a touch panel for inputting, in response to an operation by a user, various types of information to the control portion 31.

The communication portion 33 is configured to execute wired or wireless data communication, via the communication network 40, with external communication devices such as the image forming apparatus 10.

Similarly to the storage portion 18 of the image forming apparatus 10, the storage portion 34 is a nonvolatile storage device.

The storage portion 34 is preliminarily stored with a printer driver for controlling the image forming apparatus 10. By being installed with the printer driver, the information processing apparatus 30 communicates with and thereby controls the image forming apparatus 10.

The image forming system 100 is configured to perform so-called confidential printing in which execution of the print job, for which an execution command has been sent from the information processing apparatus 30, is suspended until it is determined that the sender of the execution command has arrived at the location where the image forming apparatus 10 is installed.

Meanwhile, in a conventional image forming system for performing confidential printing, the print job, for which an execution command has been sent from the information processing apparatus 30, is executed after it is determined that the sender of the execution command has arrived at the location where the image forming apparatus 10 is installed. For this reason, the user needs to wait near the image forming apparatus 10 for the execution of the print job from beginning to end.

As a solution for this issue, as described below, the image forming system 100 according to the embodiment of the present disclosure is capable of reducing the print wait time during which the user waits for the confidential printing to end.

In the following, the control portion 31 of the information processing apparatus 30 is described in detail. As shown in FIG. 1, the control portion 31 includes a confirmation processing portion 311, a first setting processing portion 312, a second setting processing portion 313, and a transmission processing portion 314. Specifically, the control portion 31 uses the CPU 31A and executes the printer driver that is stored in the storage portion 34. This allows the control portion 31 to function as the confirmation processing portion 311, first setting processing portion 312, second setting processing portion 313, and transmission processing portion 314.

The confirmation processing portion 311 is configured to confirm some pages of a multiple-page document as confidential print pages.

Here, the confidential print pages are pages, among pages included in a document to be printed according to the print job, that are suspended from being printed until it is determined that the sender of the execution command for the print job has arrived at the location where the image forming apparatus 10 is installed. Hereinafter, among all print jobs, a print job that includes the confidential print pages in the pages to be printed according to the print job is referred to as a "confidential print job".

For example, in the information processing apparatus 30, in response to a user operation on the operation/display portion 32, the operation/display portion 32 displays a setting screen for setting various types of setting items for the print job, and for inputting the transmission command for the execution command for the print job. Here, the setting items include the confidential printing. In addition, the setting items include print area, number of sheets to be printed, magnification, sheet size, color printing, double-sided printing, and collective printing. It is noted that collective printing is printing two, four, or eight pages onto one side of a sheet.

When confidential printing is selected as a setting on the setting screen, the confirmation processing portion 311 causes the operation/display portion 32 to display a page selection screen for selecting, from the multiple pages to be printed, pages that are to be confirmed as the confidential print pages. Then, in response to a user operation on the page selection screen, the confirmation processing portion 311 confirms some pages of the multiple-page document as the confidential print pages.

It is noted that when the confidential print pages are selected as a setting on the setting screen, the confirmation processing portion 311 may automatically select, from the multiple pages to be printed, the pages to be confirmed for confidential printing. For example, the confirmation processing portion 311 may confirm, as the confidential print pages, pages that include a predetermined keyword such as "secret", "confidential", or "internal use only", or a predetermined mark such as a stamp that includes the keyword.

The first setting processing portion 312 is configured to set the security level for each of the confidential print pages.

For example, in the image forming system 100, it is possible to set the security level of each of the confidential print pages as one of four levels from level 1 to level 4. In the image forming system 100, the higher the security level is, the authentication procedure required to print the confidential print pages for which the security levels have been set becomes stricter. It is noted that the security level may be one of two, three, or five levels.

For example, when the confirmation processing portion 311 confirms the confidential print pages, the first setting processing portion 312 causes the operation/display portion 32 to display a security level setting screen for setting the security level of each confidential print page. Then, in response to a user operation on the security level setting screen, the first setting processing portion 312 sets the security level of each confidential print page.

It is noted that when the confirmation processing portion 311 is configured to automatically confirm the confidential print pages, the first setting processing portion 312 may automatically confirm the security level of each confidential print page. For example, the first setting processing portion 312 may set the security level of each confidential print page based on the type of keyword or mark that is included in the confidential print page.

In addition, the first setting processing portion 312 may set the security level for the confidential print job. In other words, the first setting processing portion 312 may set one security level for all confidential print pages to be printed. In addition, the control portion 31 may not include the first setting processing portion 312.

The second setting processing portion 313 is configured to set a password for the confidential print job.

For example, when the confirmation processing portion 311 confirms the confidential print pages, the second setting processing portion 313 causes the operation/display portion 32 to display a password setting screen for setting a password for the confidential print job. Then, in response to a user operation on the password setting screen, the second setting processing portion 313 sets the password for the confidential print job. It is noted that the second setting processing portion 313 may cause the operation/display portion 32 to display the password setting screen before or after processing, by the first setting processing portion 312, of setting the security level setting.

It is noted that the control portion 31 may not include the second setting processing portion 313.

The transmission processing portion 314 is configured to send the execution command for the print job to the image forming apparatus 10.

For example, when the transmission command for the execution command for the print job is input on the setting screen, the transmission processing portion 314 sends, to the image forming apparatus 10, the execution command for the print job that includes the setting content that was set on the setting screen.

In the following, the control portion 11 of the image forming apparatus 10 is described in detail. As shown in FIG. 1, the control portion 11 includes a first print controlling portion 111, a determination processing portion 112, a second print controlling portion 113, and an addition processing portion 114. Specifically, the control portion 11 uses the CPU 11A and executes the print job execution program that is stored in the storage portion 18. This allows the control portion 11 to function as the first print controlling portion 111, determination processing portion 112, second print controlling portion 113, and addition processing portion 114.

The first print controlling portion 111 is configured to, upon receiving the execution command for the confidential print job sent from the information processing apparatus 30, print normal print pages that are the pages to be printed according to the confidential print job that exclude the confidential print pages, and suspend printing of the confidential print pages.

Specifically, the first print controlling portion 111 sequentially prints the normal print pages according to the page order of the pages to be printed.

Here, when the confidential print job is performed by one or both of double-sided printing and collective printing, the first print controlling portion 111 replaces, with a predetermined replacement page, each confidential print page to be printed according to the confidential print job, and sequentially prints the pages that are to be printed including the replacement pages. For example, the replacement page is a blank page including only the page number of the confidential print page that corresponds to the replacement page. It is noted that the replacement page may include information indicating that the replacement page is a replacement for the confidential print page.

The determination processing portion 112 is configured to determine whether or not the sender of the execution command for the confidential print job has arrived at the location where the image forming apparatus 10 is installed.

For example, the determination processing portion 112 determines that the sender of the execution command for the confidential print job has arrived at the location where the image forming apparatus 10 is installed when the operator of the image forming apparatus 10 is authenticated, by a predetermined authentication method, as the sender of the execution command for the confidential print job.

Here, when the pages to be printed include multiple confidential print pages having different security levels from one another, the determination processing portion 112 uses the authentication method corresponding to the highest of the different security levels of the confidential print pages, and authenticates the operator of the image forming apparatus 10 as the sender of the execution command for the confidential print job.

For example, when the security level of the confidential print page is "1", the determination processing portion 112 uses a first authentication method to authenticate the operator of the image forming apparatus 10 as the sender of the execution command for the confidential print job. Here, the first authentication method is a method for determining that authentication is successful when input character information matches the password set by the second setting processing portion 313 for the confidential print job.

For example, the determination processing portion 112 determines whether or not character information, included in speech input via the audio input/output portion 19, matches the password set for the confidential print job. Specifically, the determination processing portion 112 executes, for the speech input via the audio input/output portion 19, a character recognition process for recognizing character information included in the speech. Then, the determination processing portion 112, based on the results of the character recognition process, determines whether or not the character information included in the input speech matches the password that has been set for the confidential print job.

It is noted that the determination processing portion 112 may determine whether or not character information input by a user operation on the operation/display portion 16 matches the password set for the confidential print job.

In addition, when the security level of the confidential print page is "2", the determination processing portion 112 uses a second authentication method to authenticate the operator of the image forming apparatus 10 as the sender of the execution command for the confidential print job. Here, the second authentication method is a method for determining that authentication is successful when character information input by speech matches the password set for the confidential print job, and it is determined that the speech is that of the sender of the execution command for the confidential print job. The second authentication method makes it possible to prevent a third party that illicitly obtained the password set for the confidential print job from printing the confidential print pages.

Specifically, the determination processing portion 112, based on the voiceprint data included in the user identification information that has been made to correspond with the source of the execution command for the confidential print job, determines whether or not the speech input via the audio input/output portion 19 is the speech of the sender of the execution command for the confidential print job.

In addition, when the security level of the confidential print page is "3", the determination processing portion 112 uses a third authentication method to authenticate the operator of the image forming apparatus 10 as the sender of the execution command for the confidential print job. Here, the third authentication method is a method for determining that the authentication is successful when it is determined by the second authentication method that authentication is successful, and it is determined based on image data photographed by the photographing portion 20 that the speech is that of the sender of the execution command for the confidential print job. The third authentication method makes it possible to prevent a third party that illicitly obtained the password set for the confidential print job from printing the confidential print pages by playing back speech data, obtained by speech synthesis, of the sender of the execution command for the confidential print job.

Specifically, based on the face image data included in the user identification information that has been made to correspond with the source of the execution command for the confidential print job, the determination processing portion 112 determines whether or not the image data photographed by the photographing portion 20 includes the face image of the sender of the execution command for the confidential print job. In addition, when it has been determined that the image data photographed by the photographing portion 20 includes the face image of the sender of the execution command for the confidential print job, the determination processing portion 112, based on changes in shape of the image of the lips included in the face image, recognizes the character information included in the speech of the photographed user corresponding to the face image. In other words, the determination processing portion 112 uses lip-reading to recognize the character information included in the speech of the photographed user. Then, when the character information included in the speech of the photographed user matches the password set for the confidential print job, the determination processing portion 112 determines that the owner of the speech that is input via the audio input/output portion 19 is the sender of the execution command for the confidential print job.

In addition, when the security level of the confidential print page is "4", the determination processing portion 112 uses a fourth authentication method to authenticate the operator of the image forming apparatus 10 as the sender of the execution command for the confidential print job. Here, the fourth authentication method is a method for determining that authentication is successful when it is determined by the third authentication method that authentication is successful, and it is determined, based on image data photographed by the photographing portion 20, that the owner of the speech has performed an operation as commanded by the image forming apparatus 10. The fourth authentication method makes it possible to prevent a third party that illicitly obtained the password set for the confidential print pages from printing the confidential print pages by playing back video data, obtained by speech and image synthesis, of the sender of the execution command for the confidential print job saying the password.

Specifically, the determination processing portion 112, after it has been determined by the third authentication method that authentication is successful, announces content of the command that is randomly selected from predetermined pieces of command content. For example, the command content prompts the operator of the image forming apparatus 10 to move a part of their body, such as "Please raise your right hand.". It is noted that when the entire body of the photographed user is not included in the image data photographed by the photographing portion 20, the determination processing portion 112 commands the operator of the image forming apparatus 10 to move further from the image forming apparatus 10 so that the entire body of the user can be photographed. Then, based on the image data photographed by the photographing portion 20, the determination processing portion 112 determines whether or not the operator of the image forming apparatus 10 has moved according to the command content of the announcement.

It is noted that when the pages to be printed include multiple confidential print pages having different security levels from one another, the determination processing portion 112 may, for the confidential print pages having the same security level, use the authentication method corresponding to the security level that has been set for the confidential print pages, and authenticate the operator of the image forming apparatus 10 as the sender of the execution command for the confidential print job.

In addition, when the security level is set for the confidential print job, the determination processing portion 112 may use the authentication method corresponding to the security level that has been set for the confidential print job, and authenticate the operator of the image forming apparatus 10 as the sender of the execution command for the confidential print job.

In addition, the determination processing portion 112 may use an authentication method that is different from those described above to authenticate the operator of the image forming apparatus 10 as the sender of the execution command for the confidential print job. For example, the determination processing portion 112 may authenticate the operator of the image forming apparatus 10 as the sender of the execution command for the confidential print job, by using an authentication method including one or more of password authentication using a password that has been made to correspond with a user, fingerprint authentication, and iris authentication.

The second print controlling portion 113, when the determination processing portion 112 determines that the sender of the execution command for the confidential print job has arrived at the location where the image forming apparatus 10 is installed, prints the confidential print pages that are included in the pages to be printed according to the confidential print job.

Specifically, the second print controlling portion 113 sequentially prints the confidential print pages according to the page order of the pages to be printed.

Here, when one or both of double-sided printing and collective printing is performed according to the confidential print job, the second print controlling portion 113 prints the normal and confidential print pages according to a layout of a sheet, on which the replacement pages have been printed, that is included in the printed matter printed by the first print controlling portion 111. The normal and confidential print pages are printed in correspondence to the replacement pages, such that the sheet on which the replacement pages have been printed can be exchanged with the sheet on which the normal and confidential print pages have been printed.

It is noted that before printing is executed by the second print controlling portion 113, the control portion 11 may command the user to place, in the sheet feeding cassette 151 or the manual feeding tray 152, the sheet on which the replacement pages have been printed. In this case, the second print controlling portion 113 may print, on the sheet that has been placed in the sheet feeding cassette 151 or the manual feeding tray 152, the confidential print pages corresponding to the replacement pages at positions where the replacement pages have been printed.

In addition, in a case where the pages to be printed include multiple confidential print pages having different security levels from one another, when the determination processing portion 112 performs authentication for confidential print pages having the same security level, the second print controlling portion 113 may print, each time authentication is successful, the confidential print pages relating to the authentication.

The addition processing portion 114 is configured to respectively add, to the pages to be printed according to the confidential print job, identification images X20 (see FIG. 5) that indicate the respective groups to which the pages are classified and the order of the groups in the pages to be printed, each group made up of one or more of the confidential print pages or one or more of the normal print pages that have sequential page numbers in the pages to be printed.

Figure 5:
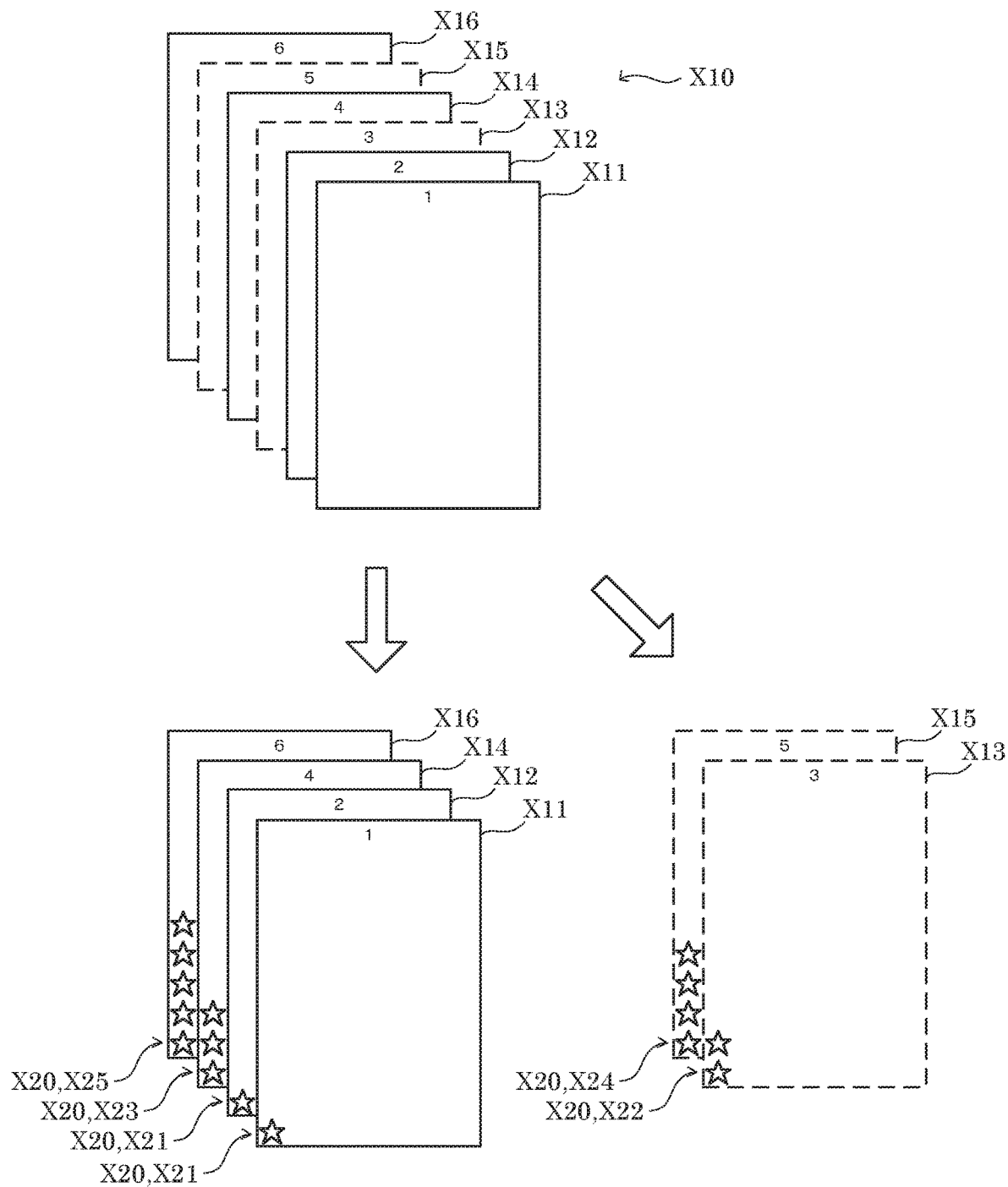
FIG. 5 is a diagram of identification images that is printed in the image forming system according to the embodiment of the present disclosure.

Here, with reference to FIG. 5, the process executed by the addition processing portion 114 is described in detail. FIG. 5 shows an example of the pages to be printed by the confidential print job, and printed matter that is output by execution of the confidential print job. As an example of the pages to be printed, FIG. 5 shows a document X10 that includes pages X11 to X16. In FIG. 5, the pages X11 to X16 are arranged in order by page in the document X10. It is noted that the page number of the page has been added in the upper center of each of the pages X11 to X16. Here, pages X13 and X15 are assumed to be specified as confidential print pages. That is, the remaining pages in the document X10 that are pages X11 to X12, X14, and X16 are normal print pages. It is noted that in FIG. 5, the confidential print pages are shown by dotted lines.

When the execution command for the confidential print job, according to which the document X10 is to be printed, is received by the image forming apparatus 10, the addition processing portion 114 divides the pages X11 to X16 in the document X10 into groups.

Specifically, the addition processing portion 114 classifies, into a first group, the pages X11 and X12 that are normal print pages with sequential page numbers in the document X10. In addition, the addition processing portion 114 classifies, into a second group, the page X13 that is the confidential print page with the sequential page number in the document X10. In addition, the addition processing portion 114 classifies, into a third group, the page X14 that is the normal print page with the sequential page number in the document X10. In addition, the addition processing portion 114 classifies, into a fourth group, the page X15 that is the confidential print page with the sequential page number in the document X10. In addition, the addition processing portion 114 classifies, into a fifth group, the page X16 that is the normal print page with the sequential page number in the document X10.

Then, the addition processing portion 114 respectively adds, to the pages X11 to X16, the identification images X20 indicating the respective groups to which the pages are classified and the order of the groups in the document X10.

Specifically, the addition processing portion 114 adds, to each of the pages X11 and X12 that are classified into the first group, an identification image X21 representing the first group and indicating the position of the first group in the order of the groups in the document X10. As shown in FIG. 5, the identification image X21 is an image of one star.

In addition, the addition processing portion 114 adds, to the page X13 that is classified into the second group, an identification image X22 representing the second group and indicating the position of the second group in the order of the groups in the document X10. As shown in FIG. 5, the identification image X22 is an image of two stars juxtaposed vertically.

In addition, the addition processing portion 114 adds, to the page X14 that is classified into the third group, an identification image X23 representing the third group and indicating the position of the third group in the order of the groups in the document X10. As shown in FIG. 5, the identification image X23 is an image of three stars juxtaposed vertically.

In addition, the addition processing portion 114 adds, to the page X15 that is classified into the fourth group, an identification image X24 representing the fourth group and indicating the position of the fourth group in the order of the groups in the document X10. As shown in FIG. 5, the identification image X24 is an image of four stars juxtaposed vertically.

In addition, the addition processing portion 114 adds, to the page X16 that is classified into the fifth group, an identification image X25 representing the fifth group and indicating the position of the fifth group in the order of the groups in the document X10. As shown in FIG. 5, the identification image X25 is an image of five stars juxtaposed vertically.

It is noted that the identification image according to the present disclosure may be different from the identification images X20 shown in FIG. 5. For example, the identification image according to the present disclosure may be an image of one or more shapes that is not a star. In addition, the identification image according to the present disclosure may be an image of a specific shape that, depending on the position where it is added on the page, indicates the group with which the identification image is associated, and the position of the group in the order of the groups. In addition, the control portion 11 may not include the addition processing portion 114.

Here, the first print controlling portion 111 prints the normal print pages on which the identification images have been added. In addition, the second print controlling portion 113 prints the confidential print pages on which the identification images have been added.

[Print Job Setting Process]

Figure 3:
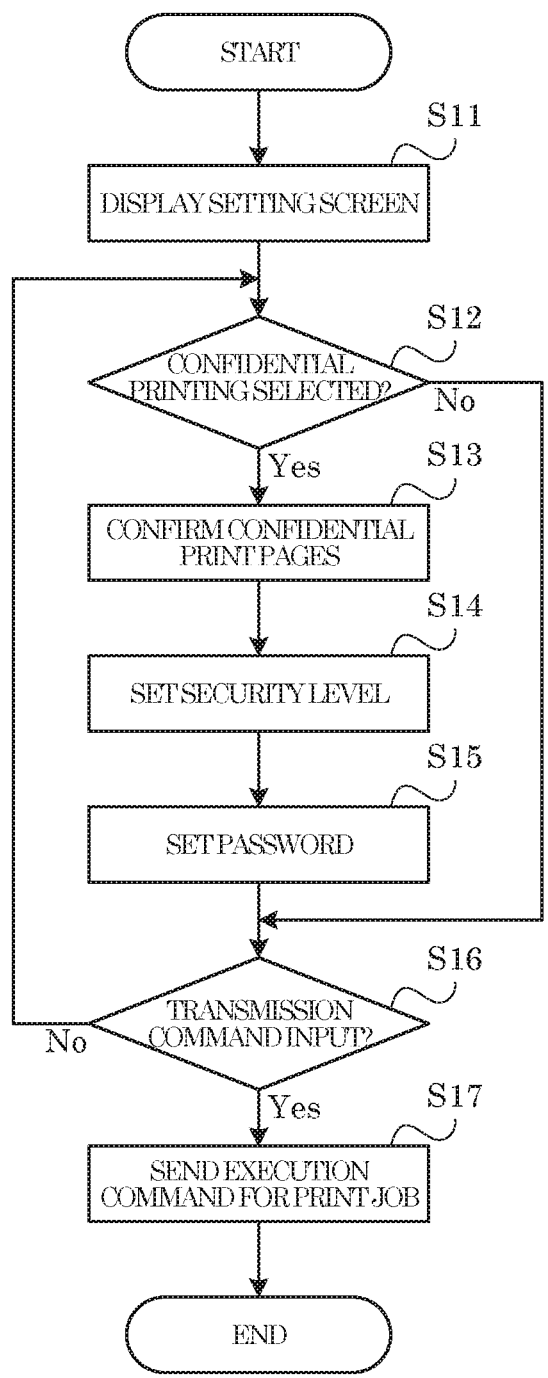
FIG. 3 is a flowchart showing an example of a print job transmission process executed in the image forming system according to the embodiment of the present disclosure.

Below, with reference to FIG. 3, a description is given of an example procedure of a print job setting process that is executed by the control portion 31 of the information processing apparatus 30 in the image forming system 100, and a part of an example procedure of an image forming method according to the present disclosure. Here, steps S11, S12 . . . indicate the numbers of processing procedures (steps) executed by the control portion 31. It is noted that the print job setting process is executed when the execution command for the print job setting process is input by a user operation on the operation/display portion 32.

<Step S11>

In step S11, the control portion 31 displays the setting screen on the operation/display portion 32.

<Step S12>

In step S12, the control portion 31 determines whether or not the confidential printing has been selected as a setting on the setting screen.

Here, when the control portion 31 determines that the confidential printing has been selected as a setting on the selection screen (Yes in S12), the control portion 31 moves the process to step S13. In addition, when the control portion 31 determines that the confidential printing has not been selected as a setting on the setting screen (No in S12), the control portion 31 moves the process to step S16.

<Step S13>

In step S13, the image reading portion 13 displays the page selection screen on the operation/display portion 32, and confirms some of the pages to be printed as the confidential print pages, in response to a user operation on the page selection screen. Here, processing in step S13 is an example of a confirming step according to the present disclosure, and the processing is executed by the confirmation processing portion 311 of the control portion 31.

<Step S14>

In step S14, the control portion 31 displays the security level setting screen on the operation/display portion 32, and sets the security level of each of the confidential print pages in response to a user operation on the security level setting screen. Here, processing in step S14 is executed by the first setting processing portion 312 of the control portion 31.

<Step S15>

In step S15, the control portion 31 displays the password setting screen on the operation/display portion 32, and sets the password for the confidential print job in response to a user operation on the password setting screen. Here, processing in step S15 is executed by the second setting processing portion 313 of the control portion 31.

<Step S16>

In step S16, the control portion 31 determines whether or not a transmission command for an execution command for the print job has been input on the setting screen.

Here, when the control portion 31 determines that the transmission command for the execution command for the print job has been input on the setting screen (Yes in S16), the control portion 31 moves the process to step S17. In addition, when the control portion 31 determines that the transmission command for the execution command for the print job has not been input on the setting screen (No in S16), the control portion 31 moves the process to step S12.

It is noted that until it is determined in step S16 that the transmission command for the execution command for the print job has been input, the control portion 31 sets, in response to a user operation on the setting screen, the content of a setting that is different from that of the confidential printing.

<Step S17>

In step S17, the control portion 31 sends, to the image forming apparatus 10, the execution command for the print job including the setting content that was set on the setting screen. Here, processing in step S17 is executed by the transmission processing portion 314 of the control portion 31.

It is noted that in the print job setting process, processing in one or both of steps S14 and S15 may be omitted.

[Print Job Execution Process]

Figure 4:
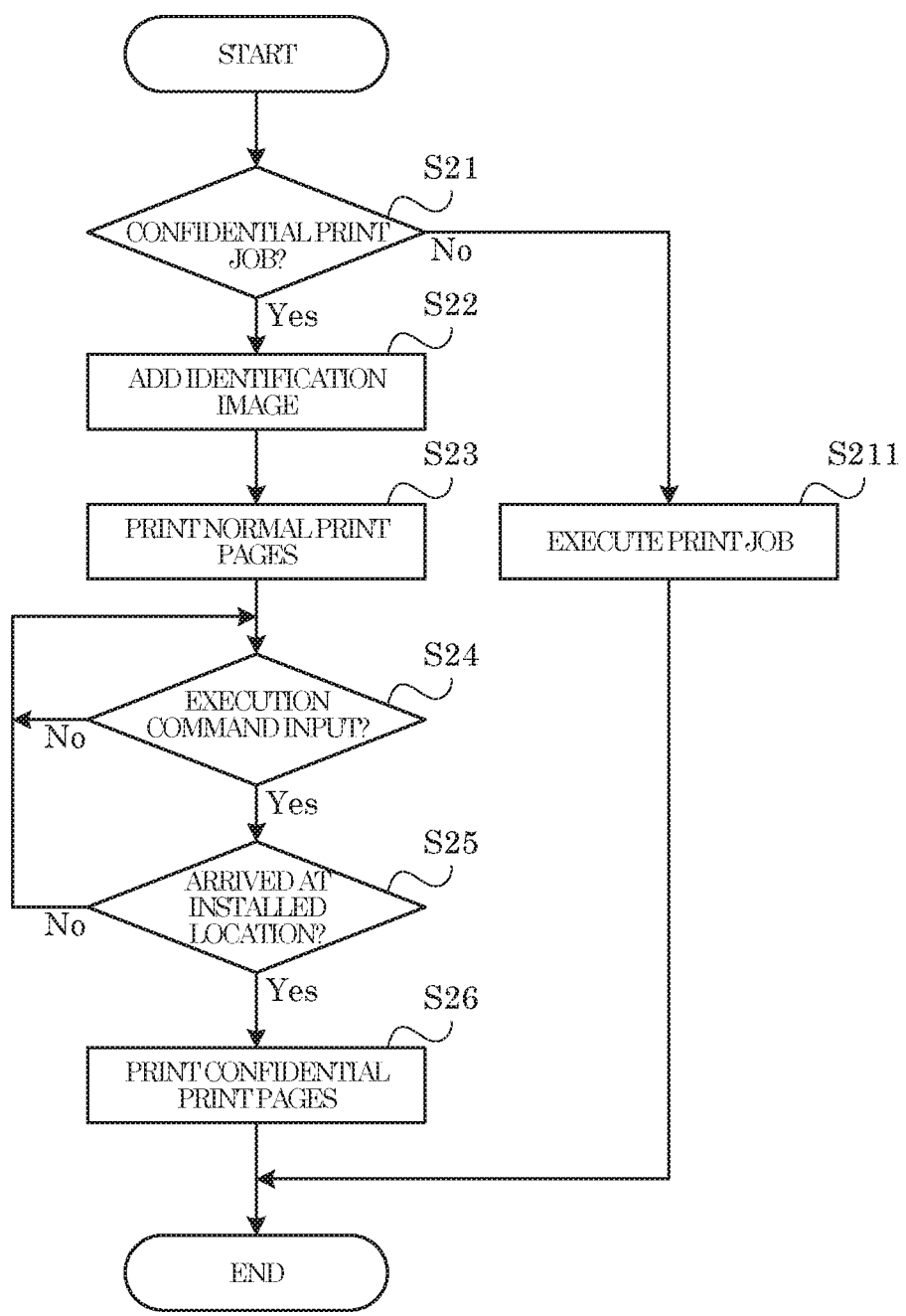
FIG. 4 is a flowchart showing an example of a print job execution process executed in the image forming system according to the embodiment of the present disclosure.

Next, with reference to FIG. 4, a description is given of an example procedure of the print job execution process that is executed by the control portion 11 of the image forming apparatus 10 in the image forming system 100, and of the remaining part of the procedure of the image forming method according to the present disclosure. It is noted that the print job execution process is executed when the execution command for the print job has been received from the information processing apparatus 30.

<Step S21>

In step S21, the control portion 11 determines whether or not the print job that has been commanded for execution by the received execution command is the confidential print job.

Here, when the control portion 11 determines that the print job that has been commanded for execution is the confidential print job (Yes in step S21), the control portion 11 moves the process to step S22. In addition, when the control portion 11 determines that the print job that has been commanded for execution is not the confidential print job (No in step S21), the control portion 11 moves the process to step S211.

<Step S211>

In step S211, the control portion 11 executes the print job that has been commanded for execution.

<Step S22>

In step S22, the control portion 11 adds the identification image X20 (see FIG. 5) to each page to be printed according to the confidential print job that has been commanded for execution. Here, processing in step S22 is executed by the addition processing portion 114 of the control portion 11.

<Step S23>

In step S23, among the pages to be printed according to the confidential print job that has been commanded for execution, the control portion 11 prints the normal print pages and suspends printing of the confidential print pages. Here, processing in step S23 is an example of a first printing step according to the present disclosure, and the processing is executed by the first print controlling portion 111 of the control portion 11.

For example, when the pages to be printed according to the confidential print job that has been commanded for execution are the document X10 shown in FIG. 5, the control portion 11 prints the normal print pages that are the pages X11 and X12, X14, and X16 (see bottom left portion of FIG. 5).

<Step S24>

In step S24, the control portion 11 determines whether or not the execution command for the confidential print job has been input on the operation/display portion 16 by a user operation.

Here, when the control portion 11 determines that the execution command for the confidential print job has been input on the operation/display portion 16 by a user operation (Yes in step S24), the control portion 11 moves the process to step S25. In addition, when the control portion 11 determines that the execution command for the confidential print job has not been input on the operation/display portion 16 by a user operation (No in step S24), the control portion 11 waits for the execution command for the confidential print job to be input in step S24.

<Step S25>

In step S25, the control portion 11 determines whether or not the sender of the execution command for the confidential print job has arrived at the location where the image forming apparatus 10 is installed. Here, processing in step S25 is an example of a determining step according to the present disclosure, and the processing is executed by the determination processing portion 112 of the control portion 11.

Specifically, when the confidential print pages included in the pages to be printed have the same security level, the control portion 11 uses the authentication method corresponding to the security level and authenticates the operator of the image forming apparatus 10 as the sender of the execution command for the confidential print job.

In addition, when the confidential print pages included in the pages to be printed have different security levels from one another, the control portion 11 uses the authentication method corresponding to the highest of the different security levels of the confidential print pages, and authenticates the operator of the image forming apparatus 10 as the sender of the execution command for the confidential print job.

Then, when the operator of the image forming apparatus 10 has been authenticated as the sender of the execution command for the confidential print job, the control portion 11 determines that the sender of the execution command for the confidential print job has arrived at the location where the image forming apparatus 10 is installed.

Here, when the control portion 11 determines that the sender of the execution command for the confidential print job has arrived where the image forming apparatus 10 is installed (Yes in step S25), the control portion 11 moves the process to step S26. In addition, when the control portion 11 determines that the sender of the execution command for the confidential print job has not arrived where the image forming apparatus 10 is installed (No in step S25), the control portion 11 moves the process to step S24.

<Step S26>

In step S26, the control portion 11 prints the confidential print pages included in the pages to be printed according to the confidential print job. Here, processing in step S26 is an example of a second printing step according to the present disclosure, and the processing is executed by the second print controlling portion 113 of the control portion 11.

For example, when the pages to be printed according to the confidential print job that has been commanded for execution are the document X10, the control portion 11 prints the confidential print pages that are the pages X13 and X15 (see bottom right portion of FIG. 5).

Here, as shown in FIG. 5, in the print job execution process, the normal print pages and the confidential print pages to which the identification images X20 have been added are printed. This allows the user to intuitively grasp, in the stack of sheets on which the normal print pages have been printed, where to insert the sheets on which the confidential print pages have been printed. With this configuration, it is possible to reduce the hassle for the user when the user combines the stack of sheets on which the normal print pages have been printed with the stack of sheets on which the confidential print pages have been printed.

It is noted that the processing in step S22 may be omitted from the print job execution process.

As described above, in the image forming system 100, when the execution command for the confidential print job is received by the image forming apparatus 10 from the information processing apparatus 30, the normal print pages, among the pages to be printed according to the confidential print job, are printed, and printing of the confidential print pages is suspended. When it is determined that the sender of the execution command for the confidential print job has arrived at the location where the image forming apparatus 10 is installed, the confidential print pages included in the pages to be printed according to the confidential print job are printed. That is, in the image forming system 100, some of the pages to be printed according to the confidential print job are printed before the sender of the execution command for the confidential print job arrives at the location where the image forming apparatus 10 is installed. With this configuration, it is possible to shorten the print wait time during which the user waits for the confidential printing to end.

It is noted that in response to a user operation, the control portion 31 of the information processing apparatus 30 may set, for the confidential print job, the duration of suspension or a time of execution. In this case, the control portion 31 may not include the first setting processing portion 312 and the second setting processing portion 313. In addition, in the case where the duration of suspension for the confidential print pages is set, when the duration of suspension elapses from the time when the execution command for the confidential print job was received, the determination processing portion 112 of the image forming apparatus 10 may determine that the sender of the execution command for the confidential print job has arrived at the location where the image forming apparatus 10 is installed. In addition, in the case where the time of execution is set, at the time of execution, the determination processing portion 112 may determine that the sender of the execution command for the confidential print job has arrived at the location where the image forming apparatus 10 is installed.

In addition, the control portion 11 of the image forming apparatus 10 may include the confirmation processing portion 311 and the first setting processing portion 312 in place of the control portion 31 of the information processing apparatus 30. In this case, when the execution command for the print job is received from the information processing apparatus 30, the confirmation processing portion 311 automatically selects, based on the keyword or the mark, each page to be confirmed as the confidential print page among the pages to be printed according to the print job that has been commanded for execution. In addition, the first setting processing portion 312 sets, based on the type of keyword or mark included on each confidential print page, the security level of the confidential print page. In addition, the determination processing portion 112 uses an authentication method that is different from the first authentication method, second authentication method, third authentication method, and fourth authentication method and authenticates the operator of the image forming apparatus 10 as the sender of the execution command for the confidential print job.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system, comprising:
a confirmation processing portion configured to confirm one or more pages of a multiple-page document as one or more confidential print pages;
a first print controlling portion configured to, upon receiving an execution command for a confidential print job according to which the document including the one or more confidential print pages is printed, print one or more normal print pages that are pages to be printed according to the confidential print job that exclude the one or more confidential print pages, and suspend printing of the one or more confidential print pages;
a determination processing portion configured to determine whether or not a sender of the execution command for the confidential print job has arrived at a location where an image forming apparatus is installed;
a second print controlling portion configured to print, when the determination processing portion determines that the sender of the execution command for the confidential print job has arrived at the location where the image forming apparatus is installed, the one or more confidential print pages among the pages to be printed according to the confidential print job;
a second setting processing portion configured to set a password for the confidential print job; and
a photographing portion configured to photograph the operator of the image forming apparatus, wherein
when an operator of the image forming apparatus is authenticated, by a predetermined authentication method, as the sender of the execution command for the confidential print job, the determination processing portion determines that the sender of the execution command for the confidential print job has arrived at the location where the image forming apparatus is installed, and
the authentication method includes a method for determining that authentication is successful when character information input by speech matches the password set by the second setting processing portion, it is determined that the speech is that of the sender of the execution command for the confidential print job, it is determined based on image data photographed by the photographing portion that the speech is that of the sender of the execution command for the confidential print job, and it is determined, based on image data photographed by the photographing portion, that an owner of the speech has performed an operation as commanded by the image forming apparatus.

2. The image forming system according to claim 1, further comprising:

a first setting processing portion configured to set a security level for each of the one or more confidential print pages, wherein when the pages to be printed include multiple confidential print pages having different security levels from one another, the determination processing portion uses the authentication method corresponding to a highest security level among the security levels corresponding to the multiple confidential print pages to authenticate the operator of the image forming apparatus as the sender of the execution command for the confidential print job.

3. The image forming system according to claim 1, further comprising:

a first setting processing portion configured to set a security level for the confidential print job, wherein the determination processing portion uses the authentication method corresponding to the security level that has been set for the confidential print job to authenticate the operator of the image forming apparatus as the sender of the execution command for the confidential print job.

4. The image forming system according to claim 1, further comprising:

an addition processing portion configured to respectively add, to the pages to be printed according to the confidential print job, identification images that indicate respective groups to which the pages are classified and an order of the groups in the pages to be printed, each of the groups made up of one or more of the confidential print pages or one or more of the normal print pages having sequential page numbers in the pages to be printed, wherein the first print controlling portion prints each of the one or more normal print pages to which the identification images have been added, and the second print controlling portion prints each of the one or more confidential print pages to which the identification images have been added.

5. An image forming method, comprising:

a confirming step of confirming one or more pages of a multiple-page document as one or more confidential print pages;

a first printing step of, upon receiving an execution command for a confidential print job according to which the document including the one or more confidential print pages is printed, printing one or more normal print pages that are pages to be printed according to the confidential print job that exclude the one or more confidential print pages, and suspending printing of the one or more confidential print pages;

a determining step of determining whether or not a sender of the execution command for the confidential print job has arrived at a location where an image forming apparatus is installed;

a second printing step of printing, when it has been determined by the determining step that the sender of the execution command for the confidential print job has arrived at the location where the image forming apparatus is installed, the one or more confidential print pages among the pages to be printed according to the confidential print job; and an addition processing step of respectively adding, to the pages to be printed according to the confidential print job, identification images that indicate respective groups to which the pages are classified and an order of the groups in the pages to be printed, each of the groups made up of one or more of the confidential print pages or one or more of the normal print pages having sequential page numbers in the pages to be printed, wherein the first printing step prints each of the one or more normal print pages to which the identification images have been added, and the second printing step prints each of the one or more confidential print pages to which the identification images have been added.

6. An image forming system, comprising:

a confirmation processing portion configured to confirm one or more pages of a multiple-page document as one or more confidential print pages;

a first print controlling portion configured to, upon receiving an execution command for a confidential print job according to which the document including the one or more confidential print pages is printed, print one or more normal print pages that are pages to be printed according to the confidential print job that exclude the one or more confidential print pages, and suspend printing of the one or more confidential print pages;

a determination processing portion configured to determine whether or not a sender of the execution command for the confidential print job has arrived at a location where an image forming apparatus is installed;

a second print controlling portion configured to print, when the determination processing portion determines that the sender of the execution command for the confidential print job has arrived at the location where the image forming apparatus is installed, the one or more confidential print pages among the pages to be printed according to the confidential print job; and an addition processing portion configured to respectively add, to the pages to be printed according to the confidential print job, identification images that indicate respective groups to which the pages are classified and an order of the groups in the pages to be printed, each of the groups made up of one or more of the confidential print pages or one or more of the normal print pages having sequential page numbers in the pages to be printed, wherein the first print controlling portion prints each of the one or more normal print pages to which the identification images have been added, and the second print controlling portion prints each of the one or more confidential print pages to which the identification images have been added.

7. The image forming system according to claim 6, wherein when an operator of the image forming apparatus is authenticated, by a predetermined authentication method, as the sender of the execution command for the confidential print job, the determination processing portion determines that the sender of the execution command for the confidential print job has arrived at the location where the image forming apparatus is installed.

8. The image forming system according to claim 7, further comprising:
  a first setting processing portion configured to set a security level for each of the one or more confidential print pages, wherein
  when the pages to be printed include multiple confidential print pages having different security levels from one another, the determination processing portion uses the authentication method corresponding to a highest security level among the security levels corresponding to the multiple confidential print pages to authenticate the operator of the image forming apparatus as the sender of the execution command for the confidential print job.

9. The image forming system according to claim 7, further comprising:
  a first setting processing portion configured to set a security level for the confidential print job, wherein
  the determination processing portion uses the authentication method corresponding to the security level that has been set for the confidential print job to authenticate the operator of the image forming apparatus as the sender of the execution command for the confidential print job.

* * * * *